United States Patent
Li et al.

(10) Patent No.: US 11,211,610 B2
(45) Date of Patent: Dec. 28, 2021

(54) POSITIVE ELECTRODE PLATE AND ELECTROCHEMICAL DEVICE CONTAINING THE SAME

(71) Applicant: Contemporary Amperex Technology Co., Limited, Ningde (CN)

(72) Inventors: Wei Li, Ningde (CN); Haihao Shi, Ningde (CN); Huihui Liu, Ningde (CN); Chao Jin, Ningde (CN); Jianbao Xu, Ningde (CN); Shisong Li, Ningde (CN); Chao Guo, Ningde (CN)

(73) Assignee: Contemporary Amperex Technology Co., Limited, Ningde (CN)

( * ) Notice: Subject to any disclaimer, the term of this patent is extended or adjusted under 35 U.S.C. 154(b) by 224 days.

(21) Appl. No.: 16/426,867

(22) Filed: May 30, 2019

(65) Prior Publication Data
US 2020/0161659 A1  May 21, 2020

(30) Foreign Application Priority Data
Nov. 16, 2018 (CN) .......................... 201811366437.1

(51) Int. Cl.
  *H01M 4/62*     (2006.01)
  *H01G 11/38*    (2013.01)
  *H01G 11/48*    (2013.01)
  *H01M 4/02*     (2006.01)

(52) U.S. Cl.
  CPC ............ *H01M 4/623* (2013.01); *H01G 11/38* (2013.01); *H01G 11/48* (2013.01); *H01M 2004/028* (2013.01)

(58) Field of Classification Search
  CPC ...... H01M 4/623; H01M 4/622; H01M 4/621; H01M 4/624; H01M 4/625; H01M 4/626; H01M 4/64; H01M 4/661; H01M 4/362; H01M 4/366; H01M 2004/028; H01G 11/38; H01G 11/32; H01G 11/30; H01G 11/48; H01G 11/46; H01G 11/50
  See application file for complete search history.

(56) References Cited

U.S. PATENT DOCUMENTS

| 10,673,045 B2 * | 6/2020 | Yu ......................... H01M 4/505 |
| 2012/0225199 A1 | 9/2012 | Muthu et al. | |
| 2017/0331146 A1 | 11/2017 | Haba et al. | |
| 2018/0145308 A1 * | 5/2018 | Tsujiko ................. G01N 29/043 |
| 2018/0248162 A1 * | 8/2018 | Takamatsu ........ H01M 10/0525 |

FOREIGN PATENT DOCUMENTS

| CN | 101232104 A | 7/2008 |
| CN | 102035039 A | 4/2011 |
| CN | 102176360 A | 9/2011 |
| CN | 102832392 A | 12/2012 |
| CN | 103904294 A | 7/2014 |
| CN | 103956499 A | 7/2014 |
| CN | 104157880 A | 11/2014 |
| CN | 104409681 A | 3/2015 |
| CN | 106220779 A | 12/2016 |
| CN | 106784617 A | 5/2017 |
| CN | 106935901 A | 7/2017 |
| CN | 108475749 A | 8/2018 |
| EP | 3483900 A1 | 5/2019 |

OTHER PUBLICATIONS

The First Office Action for Chinese Application No. 201811366437.1, dated Aug. 26, 2020, 14 pages.
The Second Office Action for Chinese Application No. 201811366437.1, dated Nov. 6, 2020, 8 pages.
The Extended European Search Report for European Application No. 19179973.3, dated Dec. 18, 2019,7 pages.
The International Search Report for PCT Application No. PCT/CN2019/118843, dated Feb. 19, 2020, 11 pages.

* cited by examiner

*Primary Examiner* — Raymond Alejandro
(74) *Attorney, Agent, or Firm* — Law Offices of Liaoteng Wang

(57) ABSTRACT

The present application relates to a positive electrode plate and an electrochemical device. The positive electrode plate includes a current collector, a positive active material layer, and a binding layer disposed between the current collector and the positive active material layer, the binding layer comprising a polymer material, a conductive material, and an inorganic filler, wherein the polymer material comprises a binding layer matrix and the binding layer matrix is an oil-dispersible polymer material having a solubility in NMP at 130° C. for 5 minutes, which is 30% or less of the solubility of PVDF under the same conditions. The positive electrode plate can improve the safety performance of the electrochemical device (for example, a capacitor, a primary battery, a secondary battery, or the like) under abnormal conditions such as nailing penetration.

11 Claims, 1 Drawing Sheet

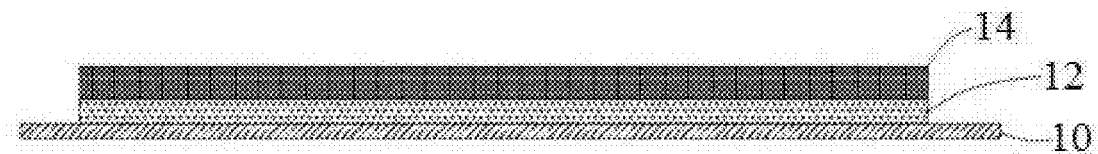

POSITIVE ELECTRODE PLATE AND ELECTROCHEMICAL DEVICE CONTAINING THE SAME

CROSS-REFERENCE TO RELATED APPLICATION

This application is based on and claims priority to Chinese Patent Application No. 201811366437.1 filed on Nov. 16, 2018, which is incorporated herein by reference in its entirety.

TECHNICAL FIELD

The present application belongs to the field of electrochemical technology, and more particularly, the present application is directed to a positive electrode plate and an electrochemical device containing the positive electrode plate.

BACKGROUND

Lithium-ion batteries are widely used in electric vehicles and consumer electronics because of their high energy density, high output power, long cycle life and small environmental pollution. However, lithium-ion batteries are prone to fire and explode when subjected to abnormal conditions such as crushing, bumping or puncture, thereby causing serious harm. Therefore, the safety problem of lithium-ion batteries greatly limits the application and popularity of the lithium-ion batteries.

Although researchers have proposed many ways to improve safety performance of batteries, there is still no very effective means for solving the safety hazard caused by the puncture of batteries. In view of this, it is indeed necessary to provide a battery that has improved safety performance, especially during nail penetration.

SUMMARY

An object of the present invention is to provide an electrode plate and an electrochemical device with improved safety performance and electrical performance.

A further object of the present invention is to provide an electrode plate and an electrochemical device with good safety performance (especially during nail penetration) and improved electrical performance (especially cycling performance).

The present application provides a positive electrode plate comprising a current collector, a positive active material layer and a binding layer disposed between the current collector and the positive active material layer, the binding layer comprising a polymer material, a conductive material and an inorganic filler, wherein the polymer material comprises a binding layer matrix and the binding layer matrix is an oil-dispersible polymer material having a solubility in NMP at 130° C. for 5 minutes, which is 30% or less of the solubility of PVDF under the same conditions.

The present invention also provides an electrochemical device comprising the positive electrode plate of the present invention, which is preferably a capacitor, a primary battery or a secondary battery.

DESCRIPTION OF THE DRAWINGS

The positive electrode plate, electrochemical device and their beneficial effects of the present invention will be described in detail below with reference to the accompanying drawings and specific embodiments.

FIG. 1 is a schematic structural view of the positive electrode plate according to an embodiment of the present application, in which 10—a current collector; 14—a positive active material layer; 12—a binding layer.

DETAILED DESCRIPTION

The present invention discloses a positive electrode plate, comprising a current collector, a positive active material layer and a binding layer disposed between the current collector and the positive active material layer. The binding layer comprises a polymer material, a conductive material and an inorganic filler, wherein the polymer material comprises a binding layer matrix and the binding layer matrix is an oil-dispersible polymer material having a solubility in NMP at 130° C. for 5 minutes, which is 30% or less of the solubility of PVDF under the same conditions.

FIG. 1 shows a schematic structural view of a positive electrode plate according to some embodiments of the present invention, wherein 10—a current collector, 14—a positive active material layer, 12—a binding layer.

It is easily understood that although the binding layer 12 and the positive active binder material layer 14 are provided on only one side of the positive electrode current collector 10 as shown in FIG. 1, in other embodiments, the binding layer 12 and the positive active material layer 14 may be disposed on both sides of the positive electrode current collector 10.

Since the binding layer disposed between the current collector and the positive active material layer has high ductility, it can play the role of wrapping the current collector and metal burrs generated in the current collector under abnormal conditions such as nailing, to prevent the metal burrs or current collector from directly contacting electrode, so that the safety performance of positive electrode plate and electrochemical device during nail penetration is improved.

It was found by the inventors that if a binding layer composed of a conventional polymer material (for example, PVDF) and a conductive material is provided between a current collector and a positive active material layer, the following problems may occur, including but not limited to: i) there may be a cracking problem of the positive active material layer, ii) DCR (DC internal resistance) of the battery may be deteriorated and iii) the binding layer may be easily deformed after the positive active material layer is compacted, so that it fails to improve safety performance effectively.

In order to overcome the above drawbacks, the present invention proceeds from various aspects, and adopts various technical means to cooperatively improve the performance and stability of the binding layer disposed between current collector and positive active material layer.

The binding layer disposed between the current collector and the positive active material layer comprises a polymer material, a conductive material, and an inorganic filler. The composition of the binding layer of the present invention will be separately described below.

First of All, the Inventors Have Found that Stability and Performance of the Binding Layer Can Be Improved by Selecting the Polymer Material of the Binding Layer.

In order to make the binding layer have good ductility meanwhile having good electrical conductivity and stability both, the weight percentage of the polymer material is usually from 35 wt % to 75 wt %, preferably from 40 wt % to 75 wt %, more preferably from 50 wt % to 75 wt % relative to the total weight of the binding layer wherein the total weight of a polymer material, a conductive material, an inorganic filler, and optionally other auxiliary agents is regarded as 100%.

In addition, the type of the polymer material in the binding layer is also important.

I. Materials for Binding Layer Matrix According to the Present Invention

In the positive electrode plate, the binding layer matrix is an oil-dispersible polymer material having a solubility in NMP at 130° C. for 5 minutes which is 30% or less of the solubility of PVDF under the same conditions.

If a conventional polymer material (for example, PVDF) is used and no choice is made on the material for binding layer matrix, the following technical problems would easily occur:

(1) When a positive active material layer is applied over a binding layer, the organic solvent (such as NMP or the like) in the slurry of the positive active material layer and the electrolyte will dissolve and swell the polymer material in the binding layer. If the extent of dissolution and swelling is large, the positive electrode active material layer is likely to be cracked due to uneven stress in the case of fast coating speed, thereby seriously affecting production and production efficiency; and (2) if the extent of dissolution and swelling is large, the DCR of the battery may be deteriorated due to the introduction of the binding layer, which is disadvantageous to the improvement of dynamic performance of the battery.

Therefore, in the present invention, an oil-dispersible polymer material having a solubility in NMP at 130° C. for 5 min which is 30% or less of the solubility of PVDF under the same conditions is used as a binding layer matrix material, and the binding layer matrix material acts as "an insoluble component", which may be effective in hindering dissolution and swelling of an organic solvent (such as NMP or the like) and an electrolyte thereto, thereby solving problems of cracking and DCR deterioration of the battery.

The binding layer matrix is selected from at least one of polyacrylonitrile, polyacrylic acid, polyacrylate, polyacrylic acid-acrylate, polyacrylonitrile-acrylic acid, and polyacrylonitrile-acrylate.

In the present invention, a water dispersible polymer material refers to such a polymer in which its molecular chain can be completely extended and dispersed in water, and an oil dispersible polymer material refers to such a polymer in which its molecular chain may be completely extended and dispersed in an oil solvent. Those skilled in the art would understand that one kind of polymer material can be separately dispersed in water and oil by using a suitable surfactant. In other words, by using a suitable surfactant, one kind of polymer material can be made into a water dispersible polymer material and an oil dispersible polymer material, respectively. For example, those skilled in the art can appropriately select an oil dispersible polyacrylonitrile or an oil dispersible polyacrylate as a binding layer matrix, i.e. insoluble polymer material as needed.

In order to enhance the adhesion between binding layer and current collector, the binding layer may further comprise a binder. In other words, the polymer material in the binding layer comprises a binding layer matrix and optionally a binder.

In order to make the above-mentioned binding layer matrix to play a more obvious role of "inhibiting dissolution and swelling", it is preferable that the weight percentage of the binding layer matrix is 20% by weight or more with respect to the total weight of the binding layer.

II. Materials for Binder According to the Present Invention

Since the action mechanism of the binding layer of the present invention is to improve safety performance of positive electrode plate and electrochemical device during nail penetration by wrapping the current collector and metal burrs generated in the current collector under abnormal conditions such as nailing, the binding force between the binding layer and the current collector should not be too small, otherwise it may not be possible to ensure that the current collector and the metal burrs generated in the current collector are effectively and reliably wrapped under abnormal conditions such as during nail penetration.

In order to increase the binding force between binding layer and current collector, the inventors have found that a binder can be added to the binding layer. The binder may be fluorinated polyolefin and/or chlorinated polyolefin, preferably at least one of polyvinylidene fluoride (PVDF), carboxylic acid modified PVDF, acrylic acid modified PVDF, polyvinylidene chloride (PVDC), carboxylic acid modified PVDC, acrylic acid modified PVDC, a PVDF copolymer, and a PVDC copolymer.

The addition of the above binder has a significant effect on improvement of the safety performance during nail penetration.

Of course, based on the selected binding layer matrix, it is also possible to choose not to add any binder.

Based on the weight of the polymer material being 100% (i.e., relative to the total weight of the polymer material in the binding layer), the binding layer matrix is present in an amount of 30% by weight to 100% by weight, and the binder is present in an amount of from 0% by weight to 70% by weight.

In the case that the content of the conductive material and the inorganic filler is constant, if the content of the binder is too high, the content of the binding layer matrix as "insoluble component" may be too low, and it is impossible to completely solve the problems of cracking of coating and deterioration of DCR of the battery.

Preferably, the weight percentage of fluorinated polyolefin and/or chlorinated polyolefin is not less than 15% by weight based on the total weight of the binding layer being 100%. In such an amount, the binding force between binding layer and current collector is strong, and the safety performance during nail penetration is improved obviously.

Secondly, the Inventors Have Found that Adding an Inorganic Filler to a Binding Layer May Serve to Stabilize the Binding Layer.

It has been found that in the case that the binding layer does not contain an inorganic filler, the solvent (such as NMP or the like) in the positive active material layer or the electrolyte over the binding layer may adversely dissolve and swell the polymer material in the binding layer, thereby damaging the binding layer and affecting its stability. After adding an inorganic filler, the inorganic filler as a barrier can advantageously eliminate the above-mentioned adverse effects such as dissolution and swelling, and thus it is advantageous for stabilizing the binding layer. In addition, it has also been found that the addition of the inorganic filler is also advantageous for ensuring that the binding layer is not easily deformed during compaction of the electrode plate. Therefore, the addition of the inorganic filler can well ensure that the binding layer is stably disposed between current collector and positive active material layer and that current collector is prevented from directly contacting positive active material layer, thereby improving safety performance of the battery.

In summary, the inorganic filler can function to stabilize the binding layer from the following two aspects: (1) eliminating the adverse effects such as such as dissolution and swelling of solvent (such as NMP or the like) in the positive electrode active material layer or the electrolyte on the polymer material in the binding layer; and (2) ensuring that the binding layer is not easily deformed during compaction of the electrode plate.

With respect to the total weight of the binding layer (i.e., the total weight of the polymer material, the conductive material, the inorganic filler, and optionally other auxiliary agents if present is regarded as 100%), the weight percentage of the inorganic filler is usually in the range of 10%-60 wt % by weight. If the content of the inorganic filler is too low, it is not enough to stabilize the binding layer; if the content is too high, it will affect ductility and other performances of the binder layer. The weight percentage of the inorganic filler is preferably from 15% by weight to 45% by weight.

When the particle size of the inorganic filler is too small, it will have increased specific surface area and thus side reaction will increase; when the particle size of the inorganic filler is too large, the application thickness of the binding layer is too large and the coating is not easy to be even. Preferably, the average particle diameter D of the inorganic filler in the binding layer fulfills the relationship of 100 nm≤D≤10 µm, more preferably 1 µm≤D≤6 µm.

It is also preferred that the inorganic filler in the binding layer has a specific surface area (BET) of not more than 500 $m^2/g$. When the specific surface area of the inorganic filler increases, side reaction will increase and thus the battery performance will be affected. Moreover, in the case that the specific surface area of the inorganic filler is too large, a higher proportion of binder will be required to be consumed, which will cause the binding force among the binding layer, the current collector and the positive active material layer to be reduced and the growth rate of the internal resistance to be high. When the specific surface area (BET) of the inorganic filler is not more than 500 $m^2/g$, a better overall effect can be provided.

The inorganic filler is selected from at least one of a metal oxide, a non-metal oxide, a metal carbide, a non-metal carbide, and an inorganic salt, or at least one of a conductive carbon coating modified above material, a conductive metal coating modified above material or a conductive polymer coating modified above material.

For example, the inorganic filler may be selected from at least one of magnesium oxide, aluminum oxide, titanium dioxide, zirconium oxide, silicon dioxide, silicon carbide, boron carbide, calcium carbonate, aluminum silicate, calcium silicate, potassium titanate, barium sulfate, lithium cobalt oxide, lithium manganese oxide, lithium nickel oxide, lithium nickel manganese oxide, lithium nickel manganese cobalt oxide, lithium nickel manganese aluminum oxide, lithium iron phosphate, lithium vanadium phosphate, lithium cobalt phosphate, lithium manganese phosphate, lithium iron silicate, lithium vanadium silicate, lithium cobalt silicate, lithium manganese silicate, lithium titanate, or at least one of a conductive carbon coating modified above material, a conductive metal coating modified above material or a conductive polymer coating modified above material.

Especially, the inventors have found that when the binding layer is used for a positive electrode plate, the use of a positive electrochemically active material or a conductive carbon coating modified above material, a conductive metal coating modified above material or a conductive polymer coating modified above material as an inorganic filler has a particular advantage. In such a case, in addition to above mentioned function as stabilizing the binding layer, i.e. hindering the solvent (such as NMP, etc.) from dissolving or swelling the polymer material of the binding layer; and ensuring that the binding layer is not easily deformed, the inorganic filler may further exert the following two functions:

(1) to improve overcharge performance of the battery. Since an electrochemically active material has the characteristics of lithium ion intercalation, it will delithiate, and the de-lithiating process has become more and more difficult, and thus impedance is increasing. Therefore, when current passes, heat-generating power increases, and the temperature of the binding layer increases faster, so the volume of the polymer material in the binding layer is increased and the conductive network composed of the conductive material in the binding layer is "destroyed", and thus the resistance in the binding layer is increased. Thus the battery overcharge safety performance may be improved.

(2) to contribute charge and discharge capacity. Since an electrochemically active material can contribute a certain charge and discharge capacity at the normal operating temperature of the battery, the effect of the binding layer on electrochemical performance such as capacity of the battery at the normal operating temperature can be dropped to be lowest.

Therefore, for the positive electrode plate, it is the most preferred to use a positive electrochemically active material or a conductive carbon coating modified above material, a conductive metal coating modified above material or a conductive polymer coating modified above material as an inorganic filler. The positive electrochemically active material is preferably at least one of lithium cobalt oxide, lithium nickel manganese cobalt oxide, lithium nickel manganese aluminium oxide, lithium iron phosphate, lithium vanadium phosphate, lithium cobalt phosphate, lithium manganese phosphate, lithium manganese iron phosphate, lithium iron silicate, lithium vanadium silicate, lithium cobalt silicate, lithium manganese silicate, spinel lithium manganese oxide, spinel lithium nickel manganese oxide, lithium titanate, or a conductive carbon coating modified above material, a conductive metal coating modified above material or a conductive polymer coating modified above material. Especially, the positive electrochemically active material is at least one of a conductive carbon coating modified above electrochemically active materials, such as conductive carbon coating modified lithium cobalt oxide, conductive carbon coating modified lithium nickel manganese cobalt oxide, conductive carbon coating modified lithium nickel manganese aluminium oxide, conductive carbon coating modified lithium iron phosphate, conductive carbon coating modified lithium vanadium phosphate, conductive carbon coating modified lithium cobalt phosphate, conductive carbon coating modified lithium manganese phosphate, conductive carbon coating modified lithium manganese iron phosphate, conductive carbon coating modified lithium iron silicate, conductive carbon coating modified lithium vanadium silicate, conductive carbon coating modified lithium cobalt silicate, conductive carbon coating modified lithium manganese silicate, conductive carbon coating modified spinel lithium manganese oxide, conductive carbon coating modified spinel lithium nickel manganese oxide, conductive carbon coating modified lithium titanate. These electrochemically active materials and conductive carbon coating modified electrochemically active materials are commonly used materials in the manufacture of lithium batteries, most of which are commercially available. The type of conductive carbon may be graphite, graphene, conductive carbon black, carbon nanotubes or the like. Further, the conductivity of the inorganic filler can be adjusted by adjusting the content of the conductive carbon coating.

Among the above materials, preferred are at least one of lithium iron phosphate, lithium vanadium phosphate, lithium cobalt phosphate, lithium manganese phosphate, lithium manganese iron phosphate or conductive carbon coating modified above materials, conductive metal coating modified above materials or conductive polymer coating modified above materials. The reason is that lithium iron phosphate, lithium vanadium phosphate, lithium cobalt phosphate, lithium manganese phosphate, lithium manganese iron phosphate and the like have high safety performance, and do not release oxygen when overcharged; and that relative to lithium cobalt oxide, lithium nickel manganese cobalt oxide and other materials, the increase of above materials in resistance is larger when overcharged, so that the binding layer generates more heat, which can enhance safety performance of the battery when overcharged.

As a further improvement of the present invention, when the conductivity σ of the inorganic filler satisfies $10^{-3}$S/m≤σ≤$10^{2}$S/m, it would produce an additional benefit. The inventors have found that the addition of inorganic fillers affects the conductive performance of the binding layer, which in turn may affect the conductivity of the whole electrode plate. When the conductivity σ of the inorganic filler satisfies $10^{-3}$S/m≤σ≤$10^{2}$S/m, the conductivity of the binding layer at the normal temperature of the battery can be improved. If the conductivity σ of the inorganic filler is too small, the initial internal resistance and internal resistance increasing rate of the binding layer will increase rapidly; if the σ is too high, the conductive network is not easily cut, which is not conducive to improving the safety performance in terms of overcharge and nail penetration.

Those skilled in the art can understand that if the conductivity σ of some inorganic fillers does not satisfy $10^{-3}$S/m≤σ≤$10^{2}$S/m, it can satisfy above requirement by the common material modification or modification means used in the art.

Thirdly, the Inventors Have Discovered that Controlling the Ratio of the Polymer Material to the Conductive Material is Beneficial to Improving Performances of the Binding Layer.

In an embodiment of the present invention, the binding layer contains a conductive material in addition to the polymer material and the inorganic filler.

In order to ensure that the electrochemical device may perform an electrochemical reaction under normal operation conditions, the binding layer must contain a certain amount of conductive material. If the content of the conductive material is too low, it is not conducive to the electrochemical reaction of the electrochemical device under normal operation conditions, and the internal resistance is too large; if the content of the conductive material is too high, the conductive network is not easily damaged, which is disadvantageous for improving overcharge safety performance of the electrochemical device.

The weight percentage of the conductive material is 5 wt %-25 wt %, preferably 5 wt % to 20 wt % with respect to the total weight of the binding layer (i.e., the total weight of the polymer material, the conductive material, the inorganic filler, and other auxiliary agents optionally present is regarded as 100%).

Preferably, the weight ratio of polymer material to conductive material in the binding layer is 2 or more, preferably 3 to 8.

The conductive material may be selected from at least one of a conductive carbon-based material, a conductive metal material, and a conductive polymer material, wherein the conductive carbon-based material is selected from at least one of conductive carbon black, acetylene black, graphite, graphene, carbon nanotubes, carbon nanofibers; the conductive metal material is selected from at least one of Al powder, Ni powder, and gold powder; and the conductive polymer material is selected from at least one of conductive polythiophene, conductive polypyrrole, and conductive polyaniline. The conductive materials may be used alone or in combination of two or more.

The conductive materials are typically used in the form of powders or granules. The particle size may be 5 nm to 500 nm, for example, 10 nm to 300 nm, 15 nm to 200 nm, 15 nm to 100 nm, 20 nm to 400 nm, 20 nm to 150 nm, or the like, depending on the specific application environment.

The Binding Layer of the Present Invention

The binding layer of the present invention can be formed by a conventional method. For example, the binding layer may be obtained by dissolving a polymer material, a conductive material, an inorganic filler, and optionally other auxiliary agents in a solvent and stirring them to form a slurry, and then applying the slurry over a current collector followed by heating and drying.

In some preferred embodiments of the present invention, the present binding layer may consist essentially of the polymer material including a binding matrix and an optionally binder, a conductive material, and an inorganic filler, i.e., it does not contain a significant amount (e.g., a content of ≤3%, ≤1%, or ≤0.5%) of other components.

In the positive electrode plate of the present invention, the binding layer is directly adhered to the current collector and disposed between the current collector and the positive active material layer. The thickness H of the binding layer can be reasonably determined according to actual needs. The thickness H of the binding layer is usually not more than 40 μm, preferably not more than 25 μm, more preferably not more than 20 μm, 15 μm or 10 μm. The thickness of the binding layer is usually greater than or equal to 1 μm, preferably greater than or equal to 2 μm, and more preferably greater than or equal to 3 μm. If the thickness is too small, it is not enough to ensure that the binding layer has the effect of improving safety performance of the battery; if it is too large, the internal resistance of the battery will increase seriously, which will affect electrochemical performance of the battery during normal operation. Preferably, 1 μm≤H≤20 μm, more preferably 3 μm≤H≤10 μm.

Preferably, the binding force between the binding layer and the current collector is preferably 10 N/m or more.

Usually, the binding layer and the positive active material layer are not easily separated after coating and drying. Therefore, in the present invention, the binding layer and positive active material layer are collectively referred to as a film layer. Therefore, the binding force between the film layer and the current collector is equivalent to the binding force between the binding layer and the current collector.

Larger binding force can ensure that the binding layer effectively and reliably wraps the current collector and metal burrs generated in the current collector under abnormal conditions such as nailing penetration.

The inventors have also found that in the present invention, the ductility of the film layer has a certain influence on the safety performance of the electrode plate in the case of nail penetration.

For the conventional positive active material layer of lithium ion battery (i.e., a film layer without the binding layer), its elongation is generally not more than 1%, and it cannot function to wrap metal burrs, so bare metal burrs are liable to cause short circuit inside the battery. According to the positive electrode plate of the present invention, the elongation of the film layer is greatly improved due to the introduction of the binding layer, which may wrap the metal burrs that may be generated in the current collector to prevent the occurrence of short circuit in the battery, thereby greatly improving the safety performance of the battery during nail penetration.

As a further improvement of the present invention, the film layer has an elongation of 30% or more, preferably 80% or more. The advantage of the larger elongation is that in the abnormal situation such as nail penetration, the film layer with larger elongation can wrap metal burrs that may be generated in the current collector to prevent the occurrence of short circuit in the battery, thereby greatly improving the safety performance of the battery during nail penetration.

The elongation of the film layer can be adjusted by changing the type, relative amount, molecular weight, degree of crosslinking, and the like of the polymer material in the binder layer. If the content of the polymer material in the binding layer is increased, it is inevitably beneficial to the expansion of the film layer. However, if the content of the polymer material in the binding layer is too large, the content of the conductive material is relatively low, thereby causing a large increase in DCR of the battery during normal operation. Therefore, it is preferred that the film layer has an elongation of 80% or more and 300% or less.

Current Collector

For the material of the current collector, the common materials in the art, preferably metal current collectors, such as metal flakes or metal foils of stainless steel, aluminum, copper, titanium or the like can be used. Preferably, the current collector is an aluminum-containing porous current collector (for example, a porous aluminum foil). Since the aluminum metal content per unit area in the thickness direction of the cell is reduced, the use of the porous aluminum foil can reduce the probability of occurrence of the metal burrs and further reduce the probability of occurrence of a severe aluminothermic reaction in an abnormal situation such as nailing, and thus can further improve safety performance of electrochemical devices. In addition, the use of porous aluminum foil can also improve infiltration of the electrolyte to the electrode plate, and thereby improve the dynamic performance of the lithium ion battery. The binding layer can cover the surface of the porous aluminum foil to prevent leakage of the upper active material layer during the coating process. The pore area of the aluminum-containing porous current collector preferably accounts for 5% to 75%.

Further, in consideration of the safety performance during nail penetration, the elongation at break δ of the current collector is preferably $0.8\% \leq \delta \leq 4\%$. It has been found that if the elongation at break of the current collector is too large, the metal burrs will be larger when puncture, which is not conducive to improving safety performance of the battery. Conversely, if the elongation at break of the current collector is too small, breakage is likely to occur during processing such as plate compaction or when the battery is squeezed or collided, thereby degrading quality or safety performance of the battery. Therefore, in order to further improve safety performance, particularly those during nail penetration, the elongation at break δ of the current collector should be no more than 4% and not less than 0.8%. The elongation at break of the metal current collector can be adjusted by changing purity, impurity content and additives of the metal current collector, the billet production process, the rolling speed, the heat treatment process, and the like.

The thickness of the current collector is preferably from 4 μm to 16 μm.

Positive Active Material Layer

The positive active material layer used in the positive electrode plate of the present invention may be selected from various conventional positive electrode active material layers commonly used in the art, which constitution and preparation process are well known in the art, and are not particularly limited. The positive electrode active material layer contains a positive electrode active material, which may be various positive electrode active materials for preparing a lithium ion secondary battery positive electrode known to those skilled in the art. For example, the positive electrode active material is a lithium-containing composite metal oxide, such as $LiCoO_2$, $LiNiO_2$, $LiMn_2O_4$, $LiFePO_4$, one or more of lithium nickel cobalt manganese oxide (such as $LiNi_{0.5}Co_{0.2}Mn_{0.3}O_2$) and one or more of lithium nickel manganese oxide.

When the positive electrode electrochemically active material (or a coating modified material thereof) is used as the inorganic filler of the binding layer of the positive electrode plate, the positive electrochemically active material in the binding layer and the positive active substance used in the positive electrode active material layer may be the same or different.

Electrochemical Device

The present application further discloses an electrochemical device, comprising the positive electrode plate according to the present invention. The electrochemical device can be a capacitor, a primary battery or a secondary battery. For example, it may be a lithium ion capacitor, a lithium ion primary battery, or a lithium ion secondary battery. In addition to the use of the positive electrode plate of the present invention, the construction and preparation methods of these electrochemical devices are known per se.

The negative electrode plate for use in conjunction with the positive electrode plate of the present invention may be selected from various conventional negative electrode plates in the art, and the constitution and preparation thereof are well known in the art. For example, the negative electrode plate may comprise a negative electrode current collector and a negative active material layer disposed on the negative electrode current collector, and the negative active material layer may comprise a negative active material, a binder, a conductive material, and the like. The negative electrode active material is, for example, a carbonaceous material such as graphite (artificial graphite or natural graphite), conductive carbon black, carbon fiber, or the like, a metal or a semimetal material such as Si, Sn, Ge, Bi, Sn, In, or an alloy thereof, and a lithium-containing nitride or a lithium-containing oxide, a lithium metal or a lithium aluminum alloy.

Due to the use of the positive electrode plate as described above, the battery can have improved safety (e.g., during nail penetration) and electrical performances. Furthermore, the positive electrode plate according to the present application can be easily processed, so that the manufacturing cost of the battery can be reduced by using the positive electrode plate according to the present application.

It will be understood by those skilled in the art that various definitions or preferred ranges of component selection, component content, and material physicochemical property parameters in the binding layer may be arbitrarily combined. Various embodiments of the present invention mentioned above by such a combination are still within the scope of the invention and are considered as part of the disclosure of this specification.

DETAILED DESCRIPTION

In order to make the objects, the technical solutions and the beneficial technical effects of the present invention more clear, the present invention will be described in further detail below with reference to the embodiments. However, it is to be understood that the embodiments of the present invention are only intended to be illustrative of the present invention, and are not intended to limit the invention, and the embodiments of the present invention are not limited to the embodiments given in the specification. The experimental conditions not indicated in the examples may refer to conventional conditions, or the conditions recommended by the material supplier or equipment supplier.

1. Preparation Method 1.1 Preparation of Positive Electrode Plate

1) Binding Layer

A certain ratio of a binding layer matrix, an optional binder, a conductive material, an inorganic filler were mixed with N-methyl-2-pyrrolidone (NMP) as a solvent, uniformly stirred and then coated on both sides of metal current collector, followed by drying at 85° C. to obtain a binding layer.

2) Positive Active Material Layer

Then, 90 wt % of a positive active material, 5 wt % of SP, and 5 wt % of PVDF were mixed with NMP as a solvent, uniformly stirred and then coated on the binding layer of the current collector as prepared according to the above method followed by drying at 85° C. to obtain a positive active material layer.

3) Post-Treatment

Then, the current collector with the binding layer and the positive active material layer was cold-pressed, then trimmed, cut, and stripped, followed by drying under vacuum at 85° C. for 4 hours. After welding, the positive electrode plate meeting the requirements of the secondary battery was obtained.

The main materials used in the binding layer of the specific examples were as follows:

Binding layer matrix: polyacrylonitrile, polyacrylonitrile-acrylate, polyacrylate;
Positive active material: NCM 811 ($LiNi_{0.8}Co_{0.1}Mn_{0.1}O_2$);
Binder: PVDF (Manufacturer "Solvay", model 5130);
Conductive material (conductive agent): Super-P (TIMCAL, Switzerland, abbreviated as SP);
Inorganic filler: alumina, carbon coating modified lithium iron phosphate (abbreviated as LFP/C), carbon coating modified lithium titanate (abbreviated as $Li_4Ti_5O_{12}$/C);

The above materials were commonly used materials in the lithium battery industry which may be commercially available from the corresponding suppliers.

1.2 Preparation of Negative Electrode Plate

Negative electrode plate was prepared as follows: active material graphite, conductive agent Super-P, thickener CMC, binder SBR were added to deionized water as a solvent at a mass ratio of 96.5:1.0:1.0:1.5 to form an anode slurry; then the slurry was coated on the surface of the negative electrode metal current collector in the form of copper foil, and dried at 85° C., then trimmed, cut, and stripped, followed by drying under vacuum at 110° C. for 4 hours. After welding, the negative electrode plate meeting the requirements of the secondary battery was obtained.

1.3 Preparation of Electrolyte

Ethylene carbonate (EC), ethyl methyl carbonate (EMC), and diethyl carbonate (DEC) were mixed at a volume ratio of 3:5:2 to obtain a mixed solvent of EC/EMC/DEC, followed by dissolving the fully dried lithium salt $LiPF_6$ into the mixed organic solvent at a concentration of 1 mol/L to prepare an electrolyte.

1.4 Preparation of the Battery

A polypropylene film with a thickness of 12 μm was used as a separator, and the positive electrode plate, the separator and the negative electrode plate were stacked in order, so that the separator was sandwiched in between the positive electrode plate and the negative electrode plate, and then the stack was wound into a bare battery core. After vacuum baking at 75° C. for 10 h, the electrolyte (prepared as described in "1.3 Preparation of electrolyte" above) was injected therein followed by vacuum package and standing for 24 h. After that, the battery core was charged to 4.2 V with a constant current of 0.1 C, and then was charged with a constant voltage of 4.2 V until the current dropped to 0.05 C, and then was discharged to 3.0V with a constant current of 0.1 C. Above charging and discharging processes were repeated twice. Finally, the battery core was charged to 3.8V with a constant current of 0.1 C, thereby completing the preparation of the secondary battery.

2. Tests for Material Performances

In each of the examples and comparative examples, the physical property parameters of the materials were measured by the common method in the art, unless otherwise specified.

Some specific parameters were tested using the following methods.

2.1 Particle Size

The power sample was dispersed in a dispersing medium (distilled water), which was measured with a Malvern laser particle size analyzer MS2000 for 5 times and averaged in unit of μm.

2.2 BET (Specific Surface Area)

The specific surface area of the powder sample of the test material was measured with a Quadrasorb SI specific surface tester for 5 times and averaged in unit of $m^2$/g.

2.3 Binding Force Between Binding Layer and Current Collector

The electrode plate containing a film layer on both sides of the current collector was cut into a sample to be tested having a width of 2 cm and a length of 15 cm. One side of the sample to be tested was uniformly adhered to a stainless steel plate at 25° C. under normal pressure by using 3M double-sided tape. One end of the sample to be tested was fixed on a GOTECH tensile machine, and the film layer of the sample to be tested was stripped from the current collector by using the GOTECH tensile machine, wherein the maximum tensile force was read according to the data diagram of the tensile force and the displacement. The resulting value (in unit N) was divided by 0.02 to calculate the binding force (N/m).

2.4 Elongation at Break of Current Collector

Two samples having a length of 200 mm and a width of 15 mm were taken from the current collector. The sample was then mounted on a tensile machine (model AI7000) and the two tests were averaged as the test result. Record the initial length L0, and start the tensile machine, until the sample broke, and read the displacement L1 of the sample at break from the tensile machine. Elongation at break=(L1−L0)/L0*100%.

2.5 Thickness of Current Collector, Thickness of Binding Layer and Thickness of Film Layer Thickness of the current collector was measured by a micrometer at 5 points and averaged.

Thickness of the binding layer and thickness of the film layer: first measure the thickness of the current collector, and then measure the total thickness of the current collector with the binder layer. The difference between the two values was used as the thickness of the binding layer. A similar method was used for the thickness of the film layer.

2.6 Cracking of Coating

After drying and obtaining a positive active material layer, if no cracks were observed in the 100 m² electrode plate, it was defined as no cracking; if the number of occurrences of cracks in 100 m² electrode plate was ≤3, it was defined as mild cracking; if the number of occurrences of cracks in 100 m² electrode plate was >3, it was defined as severe cracking.

2.7 Solubility in NMP at 130° C. for 5 Min

The polymer material was made into a binding film having a thickness of about 7 μm, then cut into 20 mm*50 mm strips, weighed and recorded as M1;

The binding film was placed in NMP (N-methylpyrrolidone) solvent, set at 130° C. for 5 min, taken out, and vacuum dried at 100° C. After drying, it was weighed and recorded as M2;

Then solubility was calculated as =(M1−M2)/M1*100%

In the present invention, for convenience of comparison, the solubility of PVDF (manufacturer "Solvay", model 5130) was used as a control, and it was recorded as 100%. The ratio of the solubility of other materials to the solubility of PVDF was recorded.

2.8 Elongation of the Film Layer

Removal of the current collector from the electrode plate: take the positive electrode plate out of the battery core, add the electrolyte, so that the electrode plate was completely immersed in the electrolyte, which was stored at 90° C. for more than 48 h, and then taken out. After that, the film layer of the positive electrode plate can be peeled off from the current collector.

The resulting film was used to prepare a sample having a width of 20 mm and a length of 50 mm. The sample was then mounted on a tensile machine (model AI7000) and the initial length L0 was recorded. Start the tensile test until the sample breaks. The displacement L1 of the sample at break was read from the tensile machine. The elongation=(L1−L0)/L0*100%.

3. Test for Battery Performance

The safety performances of the secondary batteries from various examples and comparative examples were evaluated using GBT31485-2015 "Safety Requirements and Test Methods for Traction Battery of Electric Vehicle", and the test results were recorded.

3.1 Puncture Test:

The secondary battery was fully charged to the charging cut-off voltage with a current of 1 C, and then charged with a constant voltage until the current dropped to 0.05 C. After that, charging was terminated. A high temperature resistant steel needle of φ5-10 mm (the tip thereof had a cone angle of 45°) was used to puncture the battery plate at a speed of 25 mm/s in the direction perpendicular to the battery plate. The puncture position should be close to the geometric center of the surface to be punctured, the steel needle stayed in the battery, and then observe if the battery had an indication of burning or exploding.

20 battery samples were measured with the above test.

3.2 Overcharge Test:

The secondary battery was fully charged to the charging cut-off voltage with a current of 1 C, and then charged with a constant voltage until the current dropped to 0.05 C. After that, charging was terminated. Then, after charging with a constant current of 1 C to reach 1.5 times the charging cut-off voltage or after charging with a constant current of 1 C for 1 hour, the charging was terminated.

20 battery samples were measured with the above test.

3.3 Cycle Performance Test:

The test conditions for the cycle performance test were as follows: the secondary battery was subjected to a 1C/1C cycle test at 25° C. in which the charging and discharging voltage range was 2.8 to 4.2 V. The test was terminated when the capacity was attenuated to 80% of the first discharging specific capacity.

3.4 DC Resistance Growth Test

The secondary battery was fully charged to the charging cut-off voltage with a current of 1 C, and then charged with a constant voltage until the current was reduced to 0.05 C. After that, the charging was terminated and the DC resistance of the battery core was tested (discharging with a current of 4 C for 10 s). Then, the battery core was placed at 130° C. for 1 h followed by testing the DC resistance, and calculating the DC resistance growth rate. Then, the battery core was placed at 130° C. for 2 h followed by testing the DC resistance, and calculating the DC resistance growth rate.

3.5 DCR Test

The secondary battery was adjusted to 50% SOC with a current of 1 C at 25° C., and the voltage U1 was recorded. Then, it was discharged with a current of 4 C for 30 seconds, and the voltage U2 was recorded. DCR=(U1−U2)/4 C.

In the present invention, for convenience of comparison, the DCR of the battery core in which the polymer material only containing PVDF was used as a control, and was recorded as 100%, and the DCR of the other battery cores and the ratio thereof were calculated and recorded.

4. Performance Test Results 4.0 Solubility of Binding Layer Matrix

The different binding layer matrices were selected and the solubility was measured as described in "2.7 Solubility in NMP at 130° C. for 5 min". The results are as follows:

| Solubility in NMP at 130° C. for 5 min | |
| --- | --- |
| Materials | solubility |
| PVDF | 100% |
| Polyacrylonitrile | 8% |
| Polyacrylonitrile-acrylate | 12% |
| polyacrylate | 15% |

The above results show that polyacrylonitrile, polyacrylonitrile-acrylate and polyacrylate are all an oil dispersible polymer material having a solubility in NMP at 130° C. for 5 min, which is 30% or less of the solubility of PVDF under the same conditions. These materials may be used as matrix material in the binding layer of the present invention.

4.1 Protection Performance of Binding Layer and Effect Thereof on Battery Performance In order to confirm the protection performance of binding layer, the corresponding binding layer, positive electrode plate, negative electrode plate and battery were prepared with the specific materials and amounts listed in Table 1-1 below according to the methods and procedures described in "1. Preparation method", and were tested according to the method specified in "3. Tests for battery performance". In order to ensure accuracy of data, 4 samples were prepared for each battery (20 samples for the puncture test and overcharge test) and tested independently. The final test results were averaged and shown in Table 1-2.

In the test, the conventional electrode plate CPlate P was prepared with the method described in "1.1 Preparation of positive electrode plate", but the binding layer was not provided. That is to say, a positive active material was directly applied over the current collector. The conventional electrode plate Cplate N was prepared according to the method described in "1.2 Preparation of negative electrode plate".

TABLE 1-1

Compositions of electrode plate

| | Current collector | Electrode active material | Composition of the binder layer | | | | | | Thickness of binding layer H (μm) |
|---|---|---|---|---|---|---|---|---|---|
| | | | polymer material (matrix) material | wt % | conductive material material | wt % | Inorganic filler material | wt % | |
| CPlate P | Al foil | NCM811 | / | / | / | / | / | / | / |
| Comp. Plate 1 | Al foil | NCM811 | PVDF | 55 | SP | 15 | LFP/C | 30 | 5 |
| Plate 1 | Al foil | NCM811 | polyacrylonitrile | 55 | SP | 15 | LFP/C | 30 | 5 |
| Plate 2 | Al foil | NCM811 | Polyacrylonitrile-acrylate | 55 | SP | 15 | LFP/C | 30 | 5 |
| Plate 3 | Al foil | NCM811 | Polyacrylate | 55 | SP | 15 | LFP/C | 30 | 5 |
| Comp. Plate 2 | Al foil | NCM811 | polyacrylate | 80 | SP | 20 | / | / | 5 |

TABLE 1-2

Performances of lithium-ion batteries

| Battery No. | Positive electrode plate | Negative electrode plate | Puncture Test (20 samples) | cracking | DCR |
|---|---|---|---|---|---|
| Battery 1 | CPlate P | CPlate N | 0 pass | No cracking | 75% |
| Battery 2 | Comp. Plate 1 | CPlate N | All pass | Severe cracking | 100% |
| Battery 3 | Plate 1 | CPlate N | 10 pass | No cracking | 84% |
| Battery 4 | Plate 2 | CPlate N | 12 pass | No cracking | 88% |
| Battery 5 | Plate 3 | CPlate N | 15 pass | No cracking | 92% |
| Battery 6 | Comp. Plate 2 | CPlate N | 3 pass | No cracking | 90% |

The data in Table 1-1 and Table 1-2 indicated that (1) If a polymer material (for example, PVDF) having a relatively large dissolution or swelling is used as the binding layer matrix, cracking and DCR deterioration of the battery may occur. The polymer material having a relatively small dissolution and swelling such as polyacrylonitrile or the like as the binding layer matrix may obviously solve the above problems. Over the conventional positive electrode plate, those with the binding layer composed of the polymer material having a relatively small dissolution and swelling such as polyacrylonitrile can also significantly improve the safety performance of the battery during nail penetration;

(2) For the electrode plate in which the inorganic filler (LFP/C) is not added to the binding layer, since the binding layer is deformed or destroyed, the anti-piercing effect of the electrode plate cannot be ensured. The binding layer with an inorganic filler can effectively improve the safety performance of the battery during nail penetration.

Considering factors such as nail penetration performance, cracking and battery resistance DCR, the batteries 3, 4, and 5 using the electrode plates 1, 2, and 3 have the most balanced performance which have relatively a good safety performance during nail penetration while no coating cracking occurs and DCR is acceptable.

4.2 Effect of the Content of Each Component Contained in the Binding Layer

In order to further study the effect of the content of each component contained in the binding layer, the corresponding binding layer, positive electrode plate, negative electrode plate and battery were prepared with the specific materials and amounts listed in Table 2-1 below according to the methods and procedures described in "1. Preparation method", and then were tested according to the method specified in "3. Test for battery performance". In order to ensure the accuracy of data, 4 samples were prepared for each battery (20 samples for the puncture test or overcharge test) and tested independently. The final test results were averaged and shown in Table 2-2.

TABLE 2-1

Compositions of electrode plate

| | Current collector | Electrode active material | Composition of the binder layer | | | | | | Thickness of binding layer H (μm) |
|---|---|---|---|---|---|---|---|---|---|
| | | | polymer material (matrix) material | wt % | conductive material material | wt % | Inorganic filler material | wt % | |
| Plate-1 | Al foil | NCM811 | polyacrylonitrile | 55 | SP | 15 | LFP/C | 30 | 5 |
| Comp. Plate1-1 | Al foil | NCM811 | polyacrylonitile | 15 | SP | 20 | LFP/C | 65 | 5 |
| Comp. Plate1-2 | Al foil | NCM811 | polyacrylonitile | 85 | SP | 5 | LFP/C | 10 | 5 |
| Comp. Plate1-3 | Al foil | NCM811 | polyacrylonitile | 25 | SP | 5 | LFP/C | 70 | 5 |
| Plate1-4 | Al foil | NCM811 | polyacrylonitile | 75 | SP | 15 | LFP/C | 10 | 5 |
| Plate1-5 | Al foil | NCM811 | polyacrylonitile | 75 | SP | 10 | LFP/C | 15 | 5 |
| Plate1-6 | Al foil | NCM811 | polyacrylonitile | 60 | SP | 10 | LFP/C | 30 | 5 |
| Plate1-7 | Al foil | NCM811 | polyacrylonitile | 50 | SP | 20 | LFP/C | 30 | 5 |
| Plate1-8 | Al foil | NCM811 | polyacrylonitile | 50 | SP | 25 | LFP/C | 25 | 5 |
| Plate1-9 | Al foil | NCM811 | polyacrylonitile | 35 | SP | 5 | LFP/C | 60 | 5 |

TABLE 2-2

| Battery | Positive electrode | Negative electrode | Puncture Test (20 batteries) | Cycle Life (cycle) |
|---|---|---|---|---|
| Battery 3 | Plate 1 | CPlate N | 10 pass | 1600 |
| Battery 3-1 | Comp. Plate1-1 | CPlate N | 5 pass | 1880 |
| Battery 3-2 | Comp. Plate1-2 | CPlate N | 15 pass | 1170 |
| Battery 3-3 | Comp. Plate1-3 | CPlate N | 12 pass | 1060 |
| Battery 3-4 | Plate 1-4 | CPlate N | 13 pass | 1300 |
| Battery 3-5 | Plate 1-5 | CPlate N | 14 pass | 1200 |
| Battery 3-6 | Plate 1-6 | CPlate N | 12 pass | 1250 |
| Battery 3-7 | Plate 1-7 | CPlate N | 10 pass | 1900 |
| Battery 3-8 | Plate 1-8 | CPlate N | 9 pass | 1890 |
| Battery 3-9 | Plate 1-9 | CPlate N | 8 pass | 1300 |

The data in Table 2-1 and Table 2-2 show that: (1) If the content of inorganic filler is too low, the binding layer is easily deformed and its stability is not high, so safety performance of the battery cannot be fully improved; if the content of inorganic filler is too high, the content of the polymer matrix is too low, so that the ductility of the binding layer decreases and the binding layer cannot exert its effect of improving the safety performance during nail penetration; (2) the conductive material has a great influence on the internal resistance and polarization of the battery, so it would affect the cycle life of the battery. The higher the content of the conductive material, the smaller the internal resistance and polarization of the battery is so that the cycle life will be better.

It had been found through experiments that the appropriate content range of each component in the binding layer is as follows:

the weight percentage of the polymer material is 35 wt % to 75 wt %;

the weight percentage of the conductive material is 5 wt % to 25 wt %; and the weight percentage of the inorganic filler is from 10 wt % to 60 wt %.

As long as the content of each component in the binding layer is within the above range, the effect of improving the safety and electrical performance (e.g., cycle performance) of the battery can be achieved.

4.3 Effect of the Kind of the Inorganic Filler on Battery Performance

In order to further study the effect of materials in the binding layer on performances of the electrode plate and the battery, the corresponding binding layer, positive electrode plate, negative electrode plate and battery were prepared with the specific materials and amounts listed in Table 3-1 below according to the methods and procedures described in "1. Preparation method", and were tested according to the method specified in "3. Test for battery performance". In order to ensure accuracy of data, 4 samples were prepared for each battery (20 samples for the puncture test or overcharge test) and tested independently. The final test results were averaged which were shown in Table 3-2.

TABLE 3-1

Compositions of electrode plate

| | Current collector | Electrode active material | Composition of the binder layer | | | | | | Thickness of binding layer H (μm) |
|---|---|---|---|---|---|---|---|---|---|
| | | | polymer material (matrix) | | conductive material | | Inorganic filler | | |
| | | | material | wt % | material | wt % | material | wt % | |
| Plate-1 | Al foil | NCM811 | polyacrylonitrile | 55 | SP | 15 | LFP/C | 30 | 5 |
| Plate1-11 | Al foil | NCM811 | polyacrylonitrile | 55 | SP | 15 | Alumina | 30 | 5 |
| Plate1-12 | Al foil | NCM811 | polyacrylonitrile | 55 | SP | 15 | $Li_4Ti_5O_{12}/C$ | 30 | 5 |

TABLE 3-2

| | Performances of lithium-ion batteries | | | |
|---|---|---|---|---|
| Battery | Positive electrode | Negative electrode | Puncture Test | Overcharge Test |
| Battery 3 | Plate 1 | CPlate N | 10 pass | All pass |
| Battery 3-11 | Plate 1-11 | CPlate N | 9 pass | No pass |
| Battery 3-12 | Plate 1-12 | CPlate N | 10 pass | All pass |

The data in Tables 3-1 and 3-2 show that (1) alumina can be used as an inorganic filler to improve the safety performance of the battery during nail penetration; (2) compared to other materials (such as alumina), the electrochemically active material can further significantly improve the overcharge safety performance of the battery.

4.4 Effect of Binder on Battery Performance

In order to further study the effect of binder in the binding layer on performances of the electrode plate and the battery, the corresponding binding layer, positive electrode plate, negative electrode plate and battery were prepared with the specific materials and amounts listed in Table 4-1 below according to the methods and procedures described in "1. Preparation method", and were tested according to the method specified in "3. Test for battery performance". In order to ensure accuracy of data, 4 samples were prepared for each battery (20 samples for the puncture test or overcharge test) and tested independently. The final test results were averaged which were shown in Table 4-2.

The data in Table 4-1 and Table 4-2 show that after the binder PVDF is added to the binding layer, the safety performance of the battery during nail penetration is further improved, especially when the content of PVDF is above 15% by weight. However, due to the large dissolution and swelling of PVDF in NMP, the DCR of the battery is deteriorated and the cracking of the coating occurs when the content of polyacrylonitrile is too small It will be understood by those skilled in the art that the above application examples of the electrode plate of the present invention are only exemplified to be used for a lithium battery, but the electrode plate of the present invention can also be applied to other types of batteries or electrochemical devices, and still may produce good technical effect of the present invention.

It will be apparent to those skilled in the art that the present application may be modified and varied in accordance with the above teachings. Accordingly, the present application is not limited to the specific embodiments disclosed and described above, and modifications and variations of the present application are intended to be included within the scope of the claims of the present application. In addition, although some specific terminology is used in this specification, these terms are for convenience of illustration only and are not intended to limit the present application in any way.

TABLE 4-1

| | | | Compositions of electrode plate | | | | | | |
|---|---|---|---|---|---|---|---|---|---|
| | | | Composition of binder layer | | | | | | |
| | Current collector | Electrode active material | Polymer material | | | | Conductive material | | Inorganic filler | | Thickness of binding layer H |
| | | | Matrix | wt %[1] | binder | wt %[2] | Wt %[3] | Material | wt % | material | wt % | (μm) |
| Plate 1 | Al foil | NCM811 | polyacrylonitrile | 55 | / | 0 | 100 | SP | 15 | LFP/C | 30 | 5 |
| Plate 1-13 | Al foil | NCM811 | polyacrylonitrile | 41.3 | PVDF | 13.7 | 75 | SP | 15 | LFP/C | 30 | 5 |
| Plate 1-14 | Al foil | NCM811 | polyacrylonitrile | 38.5 | PVDF | 16.5 | 70 | SP | 15 | LFP/C | 30 | 5 |
| Plate 1-15 | Al foil | NCM811 | polyacrylonitrile | 27.5 | PVDF | 27.5 | 50 | SP | 15 | LFP/C | 30 | 5 |
| Plate 1-16 | Al foil | NCM811 | polyacrylonitrile | 16.5 | PVDF | 38.5 | 30 | SP | 15 | LFP/C | 30 | 5 |

[1,2] the weight percentage of the binder relative to the total weight of the binding layer;

[3] the weight percentage of the matrix relative to the total weight of the polymer material, i.e. binding layer matrix + binder

TABLE 4-2

| Performances of lithium-ion batteries | | | | | |
|---|---|---|---|---|---|
| Battery | Positive electrode | Negative electrode | Puncture Test | Battery DCR | Cracking |
| Battery 3 | Plate 1 | CPlate N | 10 pass | 84% | No cracking |
| Battery 3-13 | Plate 1-13 | CPlate N | 12 pass | 86% | No cracking |
| Battery 3-14 | Plate 1-14 | CPlate N | 15 pass | 88% | No cracking |
| Battery 3-15 | Plate 1-15 | CPlate N | 18 pass | 90% | No cracking |
| Battery 3-16 | Plate 1-16 | CPlate N | All pass | 92% | Mild cracking |

The invention claimed is:

1. A positive electrode plate comprising a current collector, a positive active material layer and a binding layer disposed between the current collector and the positive active material layer,
   wherein the binding layer comprises a polymer material, a conductive material and an inorganic filler, wherein the inorganic filler has a specific surface area of Brunauer-Emmett-Teller of no more than 500 $m^2/g$,
   wherein in the binding layer, relative to the total weight of the binding layer, the polymer material is present in an amount of 50 wt % to 75 wt %, the conductive material is present in an amount of 5 wt % to 20 wt % and the inorganic filler is present in an amount of 15 wt % to 45 wt %; and
   wherein the polymer material comprises a binding layer matrix and the binding layer matrix is an oil-dispersible polymer material having a solubility in N-methyl-2-pyrrolidone at 130° C. for 5 minutes, which is 30% or less of the solubility of polyvinylidene fluoride under the same conditions and the binding layer matrix is present in an amount of 20 wt % or more, relative to the total weight of the binding layer.

2. The positive electrode plate according to claim 1, wherein the polymer material further comprises a binder.

3. The positive electrode plate according to claim 1, wherein in the binder layer, the polymer material further comprises an optional binder and relative to the weight of the polymer material being 100 wt %,
   the binding layer matrix is present in an amount of 30 wt % to 100 wt % and
   the binder is present in an amount of 0 wt % to 70 wt %.

4. The positive electrode plate according to claim 1, wherein the binding layer matrix is selected from at least one of polyacrylonitrile, polyacrylic acid, polyacrylate, polyacrylic acid-acrylate, polyacrylonitrile-acrylic acid, and polyacrylonitrile-acrylate.

5. The positive electrode plate according to claim 2, wherein the binder is selected from at least one of polyvinylidene fluoride, polyvinylidene chloride, polyvinylidene fluoride copolymer and polyvinylidene chloride copolymer.

6. The positive electrode plate according to claim 1, wherein the conductive material is selected from at least one of a conductive carbon-based material, a conductive metal material, and a conductive polymer material; and
   wherein the conductive carbon-based material is selected from at least one of conductive carbon black, acetylene black, graphite, graphene, carbon nanotubes, and carbon nanofibers; and
   wherein the conductive metal material is selected from at least one of Al powder, Ni powder, and gold powder; and
   wherein the conductive polymer material is selected from at least one of conductive polythiophene, conductive polypyrrole, and conductive polyaniline.

7. The positive electrode plate according to claim 1, wherein the inorganic filler is selected from at least one of a metal oxide, a non-metal oxide, a metal nitride, a non-metal nitride, an inorganic salt, or at least one of a conductive carbon coating coated above material, a conductive metal coating coated above material or a conductive polymer coating coated above material.

8. The positive electrode plate according to claim 1, wherein the inorganic filler in the binding layer is at least one of magnesium oxide, aluminum oxide, titanium dioxide, zirconium oxide, silicon dioxide, silicon carbide, boron carbide, calcium carbonate, aluminum silicate, calcium silicate, potassium titanate, barium sulfate, lithium cobalt oxide, lithium nickel manganese cobalt oxide, lithium nickel manganese aluminum oxide, lithium iron phosphate, lithium vanadium phosphate, lithium cobalt phosphate, lithium manganese phosphate, lithium iron manganese phosphate, lithium iron silicate, lithium vanadium silicate, lithium cobalt silicate, lithium manganese silicate, spinel lithium manganate, spinel lithium nickel manganate, lithium titanate, or a conductive carbon coating coated above material, a conductive metal coating coated above material, or a conductive polymer coating coated above material.

9. The positive electrode plate according to claim 1, wherein the inorganic filler has an average particle size D of 100 nm≤D≤10 µm.

10. The positive electrode plate according to claim 1, wherein the binding layer has a thickness H of 1 µm≤H≤20 µm and the binding layer is substantially consisted of the polymer material, the conductive material and the inorganic filler.

11. An electrochemical device, comprising the positive electrode plate according to claim 1, the electrochemical device being a capacitor, a primary battery or a secondary battery.

* * * * *